US011121788B1

(12) United States Patent
He et al.

(10) Patent No.: US 11,121,788 B1
(45) Date of Patent: Sep. 14, 2021

(54) CHANNEL PREDICTION METHOD AND SYSTEM FOR MIMO WIRELESS COMMUNICATION SYSTEM

(71) Applicant: WUHAN UNIVERSITY, Hubei (CN)

(72) Inventors: Yigang He, Hubei (CN); Yongbo Sui, Hubei (CN); Liulu He, Hubei (CN); Chaolong Zhang, Hubei (CN); Hui Shao, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 17/160,371

(22) Filed: Jan. 28, 2021

(30) Foreign Application Priority Data

Jun. 8, 2020 (CN) .......................... 202010512562.X

(51) Int. Cl.
*H04B 17/373* (2015.01)
*H04L 25/02* (2006.01)
*H04B 7/0456* (2017.01)

(52) U.S. Cl.
CPC ......... *H04B 17/373* (2015.01); *H04B 7/0456* (2013.01); *H04L 25/022* (2013.01); *H04L 25/0204* (2013.01)

(58) Field of Classification Search
CPC ............... H04L 25/0204; H04L 25/022; H04L 25/0202; H04L 25/024; H04B 7/0456; H04B 17/318; H04B 17/391; H04B 7/0632
See application file for complete search history.

(56) References Cited

U.S. PATENT DOCUMENTS

| 2006/0294170 | A1* | 12/2006 | Matsuoka | ............ | H04B 7/0845 708/300 |
| 2009/0168908 | A1* | 7/2009 | Lee | ........................ | H04L 25/022 375/260 |

(Continued)

FOREIGN PATENT DOCUMENTS

| CN | 102891816 | 8/2016 |
| CN | 105207960 | 6/2018 |

(Continued)

*Primary Examiner* — Khanh C Tran
(74) *Attorney, Agent, or Firm* — JCIPRNET

(57) ABSTRACT

The disclosure discloses a channel prediction method and system for a MIMO wireless communication system. The method includes the following steps: obtaining frequency domain channel information of each antenna pair of the MIMO wireless communication system through channel estimation; processing, by inverse Fourier transform, frequency domain channel information of each antenna pair to obtain information of each effective delay path of the MIMO wireless communication system; training the width learning system; utilizing the trained width learning system to predict each effective delay path of each antenna pair, so as to obtain the information of the next moment of each effective delay path of each antenna pair; after summarizing the information of the next moment of each effective delay path of each antenna pair obtained through prediction, the Fourier transform is utilized to convert the information into predicted frequency domain channel information. The invention can provide satisfactory prediction performance.

9 Claims, 3 Drawing Sheets

(56) References Cited

U.S. PATENT DOCUMENTS

| | | | | |
|---|---|---|---|---|
| 2009/0189813 A1* | 7/2009 | Haas | ................... | G01S 11/026 |
| | | | | 342/384 |
| 2010/0128807 A1* | 5/2010 | Hyung-Jin | .......... | H04L 25/0224 |
| | | | | 375/260 |
| 2021/0021297 A1* | 1/2021 | Smyth | ................. | H04B 7/0456 |

FOREIGN PATENT DOCUMENTS

| | | |
|---|---|---|
| CN | 105142177 | 8/2018 |
| CN | 110113084 | 8/2019 |
| CN | 110830133 | 12/2020 |

* cited by examiner

US 11,121,788 B1

CHANNEL PREDICTION METHOD AND SYSTEM FOR MIMO WIRELESS COMMUNICATION SYSTEM

CROSS-REFERENCE TO RELATED APPLICATION

This application claims the priority benefit of China application serial no. 202010512562.X, filed on Jun. 8, 2020. The entirety of the above-mentioned patent application is hereby incorporated by reference herein and made a part of this specification.

BACKGROUND

Technical Field

The disclosure relates to the technical field of wireless communication self-adjusting transmission, in particular to a channel prediction method and system adopted for a MIMO (multiple-input and multiple-output, MIMO) wireless communication system.

Description of Related Art

In wireless communication, multiple-input and multiple-output (MIMO) technology overcomes the limitation of the transmission capacity of a single antenna and greatly increases the transmission capacity of wireless signals. Therefore, MIMO has become the core technology of 4G communication and the core technology of next-generation wireless communication. With the development of technology, the self-adjusting transmission of wireless communication is the trend of future development. However, due to the rapid change of the fading channel, the channel information fed back from the receiving terminal to the transmitting terminal easily expires. Channel prediction can effectively solve the above problem. Therefore, channel prediction based on outdated channel information is of great significance.

For the channel prediction of MIMO wireless communication system, related references can be found in application number 201210411234.6, which discloses a channel predication method based on decoupling MIMO. Also, related references can be found in application number 201510488937.2, which discloses a MIMO channel prediction method based on an ARMA filter. Moreover, related references can be found in application number 201910491468.8, which discloses a channel prediction method based on singular value decomposition and matrix change. Meanwhile, related references can be found in application number 201911338749.6, which discloses a MIMO channel prediction method based on improved Prony. The above methods that have been published can be classified into linear prediction methods. Although the above published methods have been verified to have certain effectiveness, they are more suitable for slow fading channel scenarios, and their performance in fast fading channel scenarios is not ideal. We noticed that nonlinear methods have also been applied in MIMO channel prediction. For example, related references can be found in application number 201510473741.6, which discloses a MIMO channel prediction method based on complex neural networks. However, the above technical disclosure patents only extend the conventional real-domain neural network to the complex number domain to cater to the complex characteristics of channel information. Since the above technical disclosure patents are based on conventional neural networks, there is still room for improvement in their performance. Therefore, it is of great significance to further provide a more effective channel prediction method for MIMO wireless communication systems.

SUMMARY

The technical problem to be solved by the disclosure is to provide a channel prediction method and system for a MIMO wireless communication system in view of the defects in the related art, thereby solving the technical problem by providing a more effective channel prediction for the MIMO system.

The technical solutions adopted by the disclosure to solve its technical problems are:

The disclosure provides a channel prediction method for a MIMO wireless communication system. The method includes the following steps:

The frequency domain channel information of each antenna pair in the MIMO wireless communication system is obtained through channel estimation.

The frequency domain channel information of each antenna pair is processed by inverse Fourier transform to obtain the information of each effective delay path of the MIMO wireless communication system.

The loss function of a width learning system and a coordinate descent method are performed to solve the output weight of the width learning system to obtain the trained width learning system.

The trained width learning system is adopted to predict each effective delay path of each antenna pair, so as to obtain information of the next moment of each effective delay path of each antenna pair.

After summarizing the information of the next moment of each effective delay path of each antenna pair obtained through prediction, the Fourier transform is performed to convert the above information into the predicted frequency domain channel information.

Further, the prediction process for predicting the effective delay path in the method of the disclosure is as follows.

$$\hat{h}_{m,n}^{pre}(i+\hbar,l) = F(\hat{h})$$

$$\hat{h} = [\hat{h}_{1,1}(i,l)^T, \hat{h}_{1,2}(i,l)^T, \ldots, \hat{h}_{1,N}(i,l)^T,$$

$$\hat{h}_{2,1}(i,l)^T, \hat{h}_{2,2}(i,l)^T, \ldots, \hat{h}_{2,N}(i,l)^T,$$

$$\vdots$$

$$\hat{h}_{M,1}(i,l)^T, \hat{h}_{M,2}(i,l)^T, \ldots, \hat{h}_{M,N}(i,l)^T]$$

$$\hat{h}_{m,n}(i,l)^T = [\hat{h}_{m,n}(i,l), \hat{h}_{m,n}(i-1,l), \ldots, \hat{h}_{m,n}(i-q+1,l)]^T$$

Specifically, $\hat{h}_{m,n}^{pre}(i+\hbar,l)$ represents the prediction information corresponding to the $i+\hbar$th sampling point of the l-th effective path of the antenna pair (m,n), and $\hat{h}_{m,n}(i,l)$ represents the estimated channel information corresponding to the i-th sampling point of the l-th effective path of the antenna pair (m,n), wherein m=1, 2, 3, ..., M, n=1, 2, 3, ..., N and l=1, 2, 3, ..., L. M and N respectively represent the number of transmitting antennas and the number of receiving antennas, $\hbar$ is the prediction time length, L is the total number of effective delay paths, q represents the number of historical sampling points used for each path, and F represents the channel predictor.

Further, the training process of the width learning system in the method of the disclosure is as follows.

Feature layer information of the width learning system is obtained, that is, $$X = [x_1, x_2, \ldots, x_\varphi] \in \mathbb{R}^{T_r \times \left(\sum_{p=1}^{\varphi} \mu_p\right)}.$$

Specifically, $x_p(t) = \tan h(\hat{h}(t)*W_{fp}+\beta_{fp})$, $p=1, 2, 3, \ldots, \varphi$, wherein $\tan h(*)$ is the hyperbolic activation function, $\hat{h}(t)$ is the t-th data sample, N is the data dimension of the sample, $T_r$ is the data length of the sample, $W_{fp}$ is the input weight matrix of the p-th unit of the feature layer, $\beta_{fp}$ is the input bias matrix of the p-th unit in the feature layer, $\mu_p$ is the number of neurons in the p-th unit in the feature layer, $p=1, 2, 3, \ldots, \varphi$, and $\varphi$ is the number of units in the feature layer.

The enhancement layer information of the width learning system is obtained, that is, $$Z = [z_1, z_2, \ldots, z_\delta] \in \mathbb{R}^{T_r \times \left(\sum_{j=1}^{\delta} v_j\right)}.$$

Specifically, $z_j = \tan h\ (\alpha(XW_{hj}+\beta_{hj}))$, $j=1, 2, 3, \ldots, \delta$, wherein $W_{hj}$ is the input weight matrix of the j-th unit of the enhancement layer, $\beta_{hj}$ is the input bias matrix of the j-th unit of the enhancement layer, $\alpha$ is the scaling factor, $v_j$ is the number of neurons in the j-th unit in the enhancement layer, $j=1, 2, 3, \ldots, \delta$, and $\delta$ is the number of units in the enhancement layer.

Under the circumstances, $Y = [\hat{h}|; x_1, x_2, \ldots, x_\varphi|z_1, z_1, \ldots, z_\delta]W_\varphi^\delta = [\hat{h}|X|Z]W_\varphi^\delta$, $X_\varphi^\delta = [\hat{h}|X|Z]$ is defined, and the loss function is adopted to estimate the output weight $W_\varphi^\delta$ of the output layer.

Further, the loss function of the width learning system in the method of the disclosure is as follows.

$$J = \min_{W_\varphi^\delta} \left( \sum_{t=1}^{T_r} (Y(t) - X_\varphi^\delta(t)W_\varphi^\delta)^2 + \lambda_{1/2} \|W_\varphi^\delta\|_{\frac{1}{2}}^{\frac{1}{2}} \right)$$

Specifically, $\lambda_{1/2}$ is the regularization coefficient of $l_{1/2}$ regularization.

Further, the method for solving the output weight in the method of the disclosure is as follows.

The coordinate descent method is performed to solve the output weight, the specific method is as follows.

1) The weight matrix $W_\varphi^\delta$ and the zero matrix $W_\varphi^{\delta int}$ are initialized.
2) $W_\varphi^\delta = W_\varphi^{int}$ is set.
3) The label $\rho=1$ is defined.
4) $\beta^{int} = \beta$ is set.
5) $(W_\varphi^\delta)_\rho$ is calculated according to the loss function of the width learning system.
6) It is determined whether the formula $$\sum_{\rho=1}^{\left(N + \sum_{p=1}^{\varphi} \mu_p + \sum_{j=1}^{\delta} v_j\right)} |(W_\varphi^\delta)_\rho - (W_\varphi^{\delta int})_\rho| \leq 10^{-8}$$

is satisfied, if it is satisfied, then $\rho=\rho+1$ and step 4) is performed, otherwise, step 5) is performed.

The disclosure provides a channel prediction system suitable for a MIMO wireless communication system, the system including the following:

A frequency domain channel estimation module is configured to obtain the frequency domain channel information of each antenna pair of the MIMO wireless communication system through channel estimation.

An effective delay path information acquisition module is adopted to process the frequency domain channel information of each antenna pair through inverse Fourier transform to obtain the information of each effective delay path of the MIMO wireless communication system.

An initialization width learning system module configured to train the width learning system.

A loss function calculation module is configured to calculate loss function.

An effective delay path information prediction module is configured to predict each effective delay path of each antenna pair according to the trained width learning system, and obtain information of the next moment of each effective delay path of each antenna pair.

A frequency domain channel information processing module is configured for summarizing the information of the next moment of each effective delay path of each antenna pair obtained through prediction, and then convert the above information into the predicted frequency domain channel information by using Fourier transform.

Further, the implementation method of the initialization width learning system module in the system of the disclosure is as follows.

Feature layer information of the width learning system is obtained, that is, $$X = [x_1, x_2, \ldots, x_\varphi] \in \mathbb{R}^{T_r \times \left(\sum_{p=1}^{\varphi} \mu_p\right)}.$$

Specifically, $x_p(t) = \tan h(\hat{h}(t)*W_{fp}+\beta_{fp})$, $p=1, 2, 3, \ldots, \varphi$, wherein $\tan h(*)$ is the hyperbolic activation function, $\hat{h}(t)$ is the t-th data sample, N is the data dimension of the sample, $T_r$ is the data length of the sample, $W_{fp}$ is the input weight matrix of the p-th unit of the feature layer, $\beta_{fp}$ is the input bias matrix of the p-th unit in the feature layer, $\mu_p$ is the number of neurons in the p-th unit in the feature layer, $p=1, 2, 3, \ldots, \varphi$, and $\varphi$ is the number of units in the feature layer.

The enhancement layer information of the width learning system is obtained, that is, $$Z = [z_1, z_2, \ldots, z_\delta] \in \mathbb{R}^{T_r \times \left(\sum_{j=1}^{\delta} v_j\right)}.$$

Specifically, $z_j = \tan h\ (\alpha(XW_{hj}+\beta_{hj}))$, $j=1, 2, 3, \ldots, \delta$, wherein $W_{hj}$ is the input weight matrix of the j-th unit of the enhancement layer, $\beta_{hj}$ is the input bias matrix of the j-th unit of the enhancement layer, a is the scaling factor, $v_1$ is the number of neurons in the j-th unit in the enhancement layer, $j=1, 2, 3, \ldots, \delta$, and $\delta$ is the number of units in the enhancement layer.

Under the circumstances, $Y = [\hat{h}|x_1, x_2, \ldots, x_\varphi|z_1, z_1, \ldots, z_\delta]W_\varphi^\delta = [\hat{h}|X|Z]W_\varphi^\delta$, $X_\varphi^\delta = [\hat{h}|X|Z]$ is defined, and the loss function is adopted to estimate the output weight $W_\varphi^\delta$ of the output layer.

Further, the implementation method of the loss function calculation module in the system of the disclosure is as follows.

The loss function J is as follows.

$$J = \min_{W_\varphi^\delta}\left(\sum_{t=1}^{T_r}(Y(t) - X_\varphi^\delta(t)W_\varphi^\delta)^2 + \lambda_{1/2}\|W_\varphi^\delta\|_{\frac{1}{2}}^{\frac{1}{2}}\right)$$

Specifically, $\lambda_{1/2}$ is the regularization coefficient of $l_{1/2}$ regularization.

Further, the coordinate descent method is adopted in the system of the disclosure to estimate the output weight of the width learning system.

The advantageous effects produced by the disclosure are as follows. In the channel prediction method and system for the MIMO wireless communication system of the disclosure, the width learning system may be adopted to predict each effective delay path of each antenna pair. Specifically, in order to improve the performance of the width learning system, the disclosure estimates the output weight of the width learning system by means of $l_{1/2}$ regularization. Therefore, the disclosure can achieve good prediction performance and can also produce sparse output weight solutions. The disclosure has laid the foundation for future self-adjusting communication technologies, such as self-adjusting coding, self-adjusting modulation, and self-adjusting prediction.

BRIEF DESCRIPTION OF THE DRAWINGS

The disclosure will be further described below in conjunction with the accompanying drawings and embodiments. In the accompanying drawings.

DESCRIPTION OF THE EMBODIMENTS

In order to make the objectives, technical solutions and advantages of the present disclosure clearer, the following further describes the present disclosure in detail with reference to the accompanying drawings and embodiments. It should be understood that the specific embodiments described here are only used to explain the present disclosure, but not to limit the present disclosure.

Figure 1:
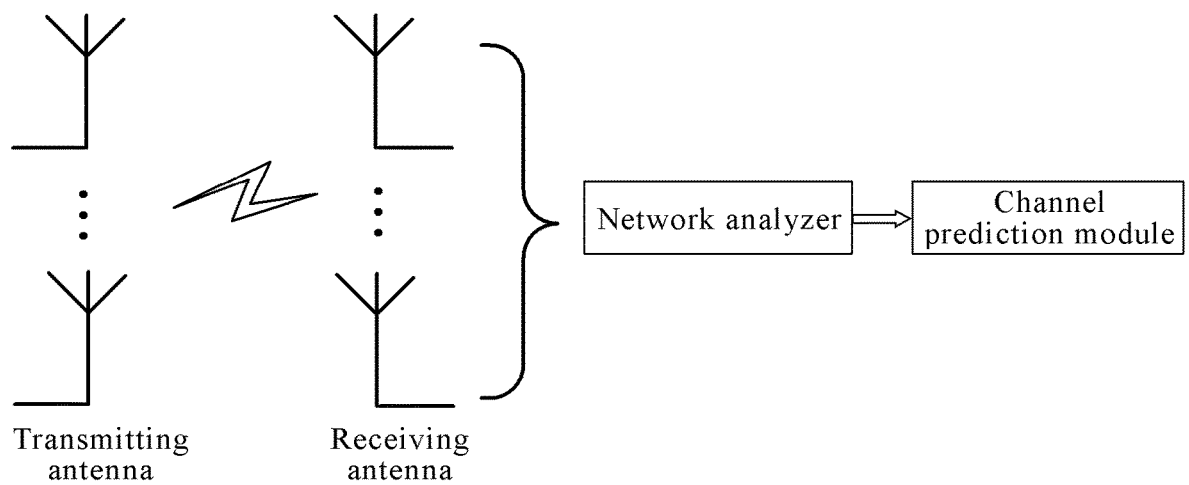
FIG. 1 is a device connection diagram provided by an embodiment of the disclosure.

As shown in FIG. 1, the MIMO wireless communication system in the embodiment of the disclosure includes the following.

A transmitting antenna is configured to transmit a wireless signal.

A receiving antenna is configured to receive a wireless signal.

A network analyzer is configured to analyze the wireless signal obtained by the receiving antenna and obtain the information of each effective delay path of each antenna pair.

A channel prediction module is configured to perform channel prediction operations.

Figure 2:
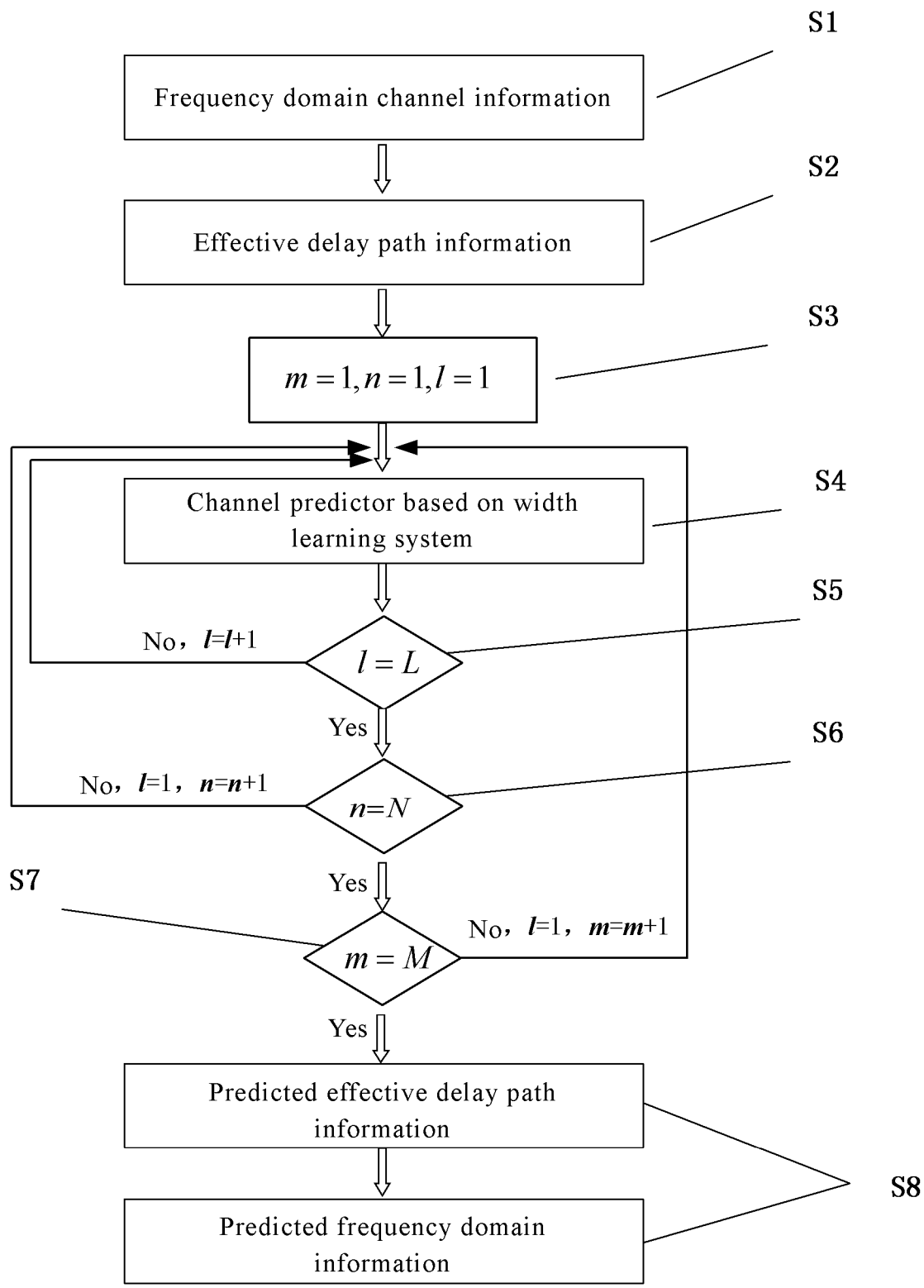
FIG. 2 is a schematic flowchart of a prediction method provided by an embodiment of the disclosure.

As shown in FIG. 2, FIG. 2 is a schematic flowchart of a channel prediction method suitable for a MIMO wireless communication system according to an embodiment of the disclosure. The method includes the following steps.

Step S1: Frequency domain channel information of each antenna pair of the MIMO wireless communication system is obtained through channel estimation.

Step S2: The information $\hat{h}_{m,n}(i,l)$, m=1, 2, 3, ..., M, n=1, 2, 3, ..., N and l=1, 2, 3, ..., L of each effective delay path of the MIMO wireless communication system is obtained through inverse Fourier transform.

Step S3: Labels m=1, n=1, and l=1 are defined.

Step S4: The width learning system is utilized to predict the l-th effective delay path of the antenna pair (m, n) to obtain the channel information at the next moment of the l-th effective delay path.

In the embodiment of the disclosure, step 4 can be specifically implemented in the following manner.

Step 41: A number of neurons $\mu_p$, $\mu$=1, 2, 3, ..., $\varphi$, of each unit is provided in the feature layer, a number of neurons $v_j$, j=1, 2, 3, ..., $\delta$, of each unit is provided in the enhancement layer.

Step 42: The input weights and biases of the feature layer and the enhancement layer are generated randomly in a certain range, that is, $W_{fp}$, $\beta_{fp}$, $W_{hj}$ and $\beta_{hj}$.

Step 43: The training process of the width learning system is as follows.

The feature layer information of the width learning system is obtained, namely $$X = [x_1, x_2, \ldots, x_\varphi] \in \mathbb{R}^{T_r \times \left(\sum_{p=1}^\varphi \mu_p\right)}.$$

Specifically, $$x_p(t) = \tan h(\hat{h}(t)*W_{fp}+\beta_{fp}), p=1,2,3,\ldots,\varphi \tag{1}$$

Specifically, tan h(*) is the hyperbolic activation function, $\hat{h}(t)$ is the dimension of t-th data sample, $T_r$ is the data length of the sample, $W_{fp}$ is the input weight matrix of the p-th unit of the feature layer, $\beta_{fp}$ is the input bias matrix of the p-th unit in the feature layer, and $\Psi$ is the number of units in the feature layer.

The enhanced layer information of the width learning system is obtained, namely $$Z = [z_1, z_2, \ldots, z_\delta] \in \mathbb{R}^{T_r \times \left(\sum_{j=1}^\delta v_j\right)}.$$

Specifically, $$z_j = \tan h(\alpha(XW_{hj}+\beta_{hj})), j=1,2,3,\ldots,\delta \tag{2}$$

Specifically, $W_{hj}$ is the input weight matrix of the j-th unit of the enhancement layer, $\beta_{hj}$ is the input bias matrix of the j-th unit of the enhancement layer, $\delta$ is the number of units in the enhancement layer, and $\alpha$ is the scaling factor.

Under the circumstances, Y=[$\hat{h}|x_1, x_2, \ldots, x_\varphi|z_1, z_1, \ldots, z_\delta$]$W_\varphi^\delta$=[$\hat{h}|X|Z$]$W_\varphi^\beta$, and $X_\varphi^\delta$=[$\hat{h}|X|Z$] is defined. Therefore, the loss function can be adopted to estimate the output weight $W_\varphi^\delta$ of the output layer.

In order to improve the generalization ability of the width learning system, the disclosure uses $l_{1/2}$ regularization to estimate the output weight, that is, $$J = \min_{W_\varphi^\delta}\left(\sum_{t=1}^{T_r}(Y(t) - X_\varphi^\delta(t)W_\varphi^\delta)^2 + \lambda_{1/2}\|W_\varphi^\delta\|_{\frac{1}{2}}^{\frac{1}{2}}\right) \tag{3}$$

The coordinate descent method is adopted to solve the output weight of the width learning system, that is, $$J(W_\varphi^\delta) = \sum_{t=1}^{T_r}\left[Y(t) - (X_\varphi^\delta)_\rho(t)(W_\varphi^\delta)_\rho - \sum_{\sigma\neq\rho}^{(N+\sum_{p=1}^{\varphi}\mu_p+\sum_{j=1}^{\delta}\nu_j)}(X_\varphi^\delta)_\sigma(j)(\tilde{W}_\varphi^\delta)_\sigma\right]^2 + \lambda_{1/2}|(W_\varphi^\delta)_\rho|^{\frac{1}{2}} + \lambda_{1/2}\sum_{\sigma\neq\rho}^{(N+\sum_{p=1}^{\varphi}\mu_p+\sum_{j=1}^{\delta}\nu_j)}|(\tilde{W}_\varphi^\delta)_\sigma|^{\frac{1}{2}} \quad (4)$$

Specifically, $(W_\varphi^\delta)_\rho$ and $(\tilde{W}_\varphi^\delta)_\sigma$ are respectively $\rho$ variables in coordinate descending and other fixed variables, $(X_\varphi^\delta)(j)$ represent the input variable corresponding to the $\rho$ variable in coordinate descending. The above formula can be written as follows.

$$J(W_\varphi^\delta) = \sum_{t=1}^{T_r}\left((X_\varphi^\delta)_\rho(t)\right)^2(W_\varphi^\delta)_\rho^2 - 2\sum_{t=1}^{T_r}\left[Y(t) - \sum_{\sigma\neq\rho}^{(N+\sum_{p=1}^{\varphi}\mu_p+\sum_{j=1}^{\delta}\nu_j)}(X_\varphi^\delta)_\sigma(t)(\tilde{W}_\varphi^\delta)_\sigma\right](X_\varphi^\delta)_\rho(t)(W_\varphi^\delta)_\rho + \sum_{t=1}^{T_r}\left[Y(t) - \sum_{\sigma\neq\rho}^{(N+\sum_{p=1}^{\varphi}\mu_p+\sum_{j=1}^{\delta}\nu_j)}(X_\varphi^\delta)_\sigma(t)(\tilde{W}_\varphi^\delta)_\sigma\right]^2 + \lambda_{1/2}|(W_\varphi^\delta)_\rho|^{\frac{1}{2}} + \lambda_{1/2}\sum_{\sigma\neq\rho}^{(N+\sum_{p=1}^{\varphi}\mu_p+\sum_{j=1}^{\delta}\nu_j)}|(\tilde{W}_\varphi^\delta)_\sigma|^{\frac{1}{2}} \quad (5)$$

Generally speaking, the following formula is true, that is, $$\sum_{t=1}^{T_r}\left((X_\varphi^\delta)_\sigma(t)\right)^2 \neq 0 \quad (6)$$

Therefore, $$J(W_\varphi^\delta) = (W_\varphi^\delta)_\rho^2 - 2(W_\varphi^\delta) \quad (7)$$

$$\frac{2\sum_{t=1}^{T_r}\left[Y(t) - \sum_{\sigma\neq\rho}^{(N+\sum_{p=1}^{\varphi}\mu_p+\sum_{j=1}^{\delta}\nu_j)}(X_\varphi^\delta)_\sigma(t)(\tilde{W}_\varphi^\delta)_\sigma\right](X_\varphi^\delta)_\rho(t)}{\sum_{t=1}^{T_r}\left((X_\varphi^\delta)_\sigma(t)\right)^2} +$$

$$\frac{\sum_{t=1}^{T_r}\left[Y(t) - \sum_{\sigma\neq\rho}^{(N+\sum_{p=1}^{\varphi}\mu_p+\sum_{j=1}^{\delta}\nu_j)}(X_\varphi^\delta)_\sigma(t)(\tilde{W}_\varphi^\delta)_\sigma\right]^2}{\sum_{j=1}^{N_T}(A_{i,\rho}^\#(j))^2} +$$

$$\frac{\lambda_{1/2}|(W_\varphi^\delta)_\rho|^{\frac{1}{2}}}{\sum_{t=1}^{T_r}\left((X_\varphi^\delta)_\sigma(t)\right)^2} + \frac{\lambda_{1/2}\sum_{\sigma\neq\rho}^{(N+\sum_{p=1}^{\varphi}\mu_p+\sum_{j=1}^{\delta}\nu_j)}|(\tilde{W}_\varphi^\delta)_\sigma|^{\frac{1}{2}}}{\sum_{t=1}^{T_r}\left((X_\varphi^\delta)_\sigma(t)\right)^2}$$

Further, the following formula can be obtained.

$$J(W_\varphi^\delta) = (W_\varphi^\delta)_\rho^2 - 2(W_\varphi^\delta)_\rho \quad (8)$$

$$\frac{2\sum_{t=1}^{T_r}\left[Y(t) - \sum_{\sigma\neq\rho}^{(N+\sum_{p=1}^{\varphi}\mu_p+\sum_{j=1}^{\delta}\nu_j)}(X_\varphi^\delta)_\sigma(t)(\tilde{W}_\varphi^\delta)_\sigma\right](X_\varphi^\delta)_\rho(t)}{\sum_{t=1}^{T_r}\left((X_\varphi^\delta)_\sigma(t)\right)^2} +$$

$$\frac{\lambda_{1/2}|(W_\varphi^\delta)_\rho|^{\frac{1}{2}}}{\sum_{t=1}^{T_r}\left((X_\varphi^\delta)_\sigma(t)\right)^2}$$

The following definitions are adopted in the disclosure, namely $$\AA_\rho = \frac{2\sum_{t=1}^{T_r}\left[Y(t) - \sum_{\sigma\neq\rho}^{(N+\sum_{p=1}^{\varphi}\mu_p+\sum_{j=1}^{\delta}\nu_j)}(X_\varphi^\delta)_\sigma(t)(\tilde{W}_\varphi^\delta)_\sigma\right](X_\varphi^\delta)_\rho(t)}{\sum_{t=1}^{T_r}\left((X_\varphi^\delta)_\sigma(t)\right)^2} \quad (9)$$

$$B_\rho = \frac{\lambda_{1/2}}{\sum_{t=1}^{T_r}\left((X_\varphi^\delta)_\sigma(t)\right)^2}$$

Therefore, the following formula is adopted.

$$(W_\varphi^\delta)_\rho = \begin{cases} \frac{2}{3}\AA_\rho\left(1+\cos\left(\frac{2}{3}(\pi-\phi_\rho)\right)\right), & |\AA_\rho| \geq \frac{3}{4}B_\rho^{\frac{2}{3}} \\ 0, & |\AA_\rho| < \frac{3}{4}B_\rho^{\frac{2}{3}} \end{cases} \quad (10)$$

Specifically, $$\phi_\rho = \arccos\left(\frac{1}{8}\text{Å}_\rho\left|\frac{B_\rho}{3}\right|^{\frac{2}{3}}\right) \quad (11)$$

Specifically, the process of the coordinate descent method in step S4 is as follows.

1) The weight matrix $W_\varphi^\delta$ and the zero matrix $W_\varphi^{\delta\ int}$ are initialized.
2) $W_\varphi^\delta = W_\varphi^{\delta\ int}$.
3) The label $\rho=1$ is defined.
4) $\beta^{int} = \beta$.
5) $(W_\varphi^\delta)_\rho$ is calculated according to (12).
6) It is determined whether the formula $$\sum_{\rho=1}^{(N+\sum_{p=1}^{\varphi}\mu_p+\sum_{j=1}^{\delta}v_j)}\left|(W_\varphi^\delta)_\rho - (W_\varphi^{\delta int})_\rho\right| \leq 10^{-8}$$

is satisfied, if it is satisfied, then $\rho=\rho+1$ and step 4) is performed, otherwise, step 5) is performed.

Step S5: It is determined whether l is equal to the maximum effective delay path number L; if not, then l=l+1, and return back to step S4.

Step S6: It is determined whether n is equal to the maximum number of receiving antennas N; if not, then l=1, n=n+1, and return back to step S4.

Step S7: It is determined whether m is equal to the maximum number of receiving antennas M; if not, then l=1, m=m+1, and return back to step S4.

Step S8: Fourier transform is performed to obtain frequency domain prediction information.

Figure 3:
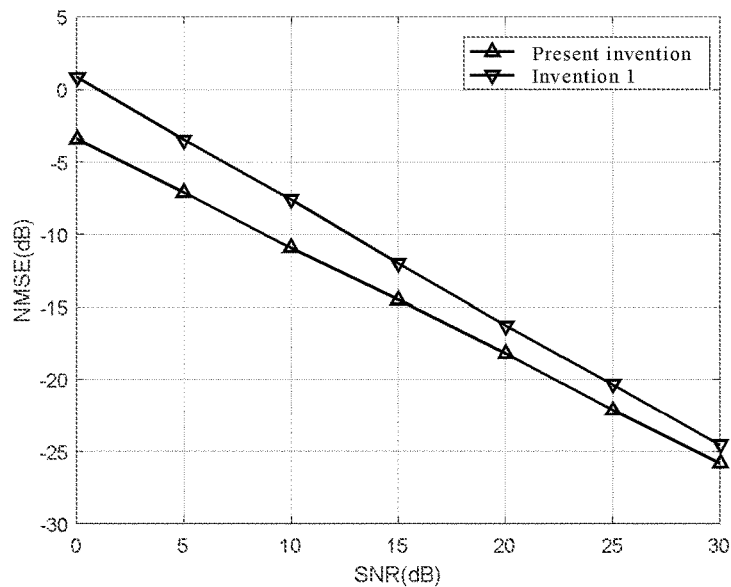
FIG. 3 shows the performance under different signal-to-noise ratios provided by an embodiment of the disclosure.

In order to verify the effectiveness of the disclosure, relevant parameters are set according to the 10 MHz mode in the 3GPP LTE standard, the number of transmitting antennas and the number of receiving antennas are set to 2 respectively, and the antenna correlation is set to high correlation. FIG. 3 shows the comparison of prediction performance under different signal-to-noise ratios. Specifically, disclosure 1 is "Complex neural network channel prediction method" (application number: 201510473741.6). It can be seen that the channel prediction method disclosed in the disclosure has an improved performance.

Figure 4:
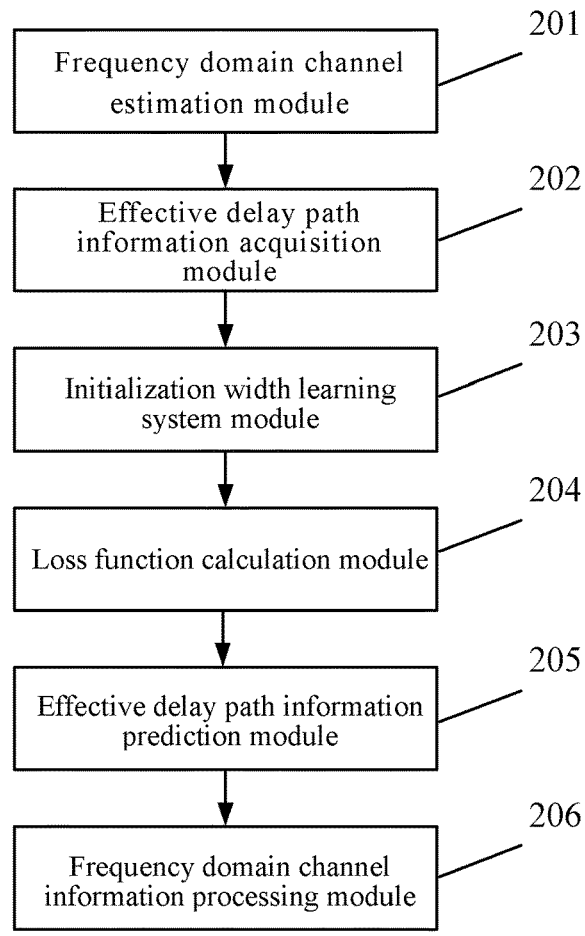
FIG. 4 is a channel prediction system suitable for a MIMO wireless communication system provided by an embodiment of the disclosure.

As shown in FIG. 4, in another embodiment of the disclosure, a channel prediction system suitable for a MIMO wireless communication system is also provided, including:

A frequency domain channel estimation module 201 is configured to obtain frequency domain channel information of each antenna pair in the MIMO wireless communication system through channel estimation.

An effective delay path information acquisition module 202 is configured for obtaining time-domain tap information through inverse Fourier transform from the frequency domain channel information of each antenna pair in the MIMO wireless communication system.

An initialization width learning system module 203 is configured for training the width learning system.

A loss function calculation module 204 is configured to calculate the loss function.

An effective delay path information prediction module 205 is configured to predict each delay path information for each antenna pair by using the trained width learning system.

A frequency domain channel information processing module 206 is configured to summarize the channel information of the next moment of the effective delay path obtained by prediction, and then convert the above information into the predicted frequency domain channel information by using Fourier transform.

Specifically, reference of the specific implementation of each module can be found in the description of the foregoing method embodiment, and no further description is narrated herein.

In another embodiment of the disclosure, a computer-readable storage medium with program instructions stored thereon is further provided, and the program instructions implement the aforementioned channel prediction method for MIMO wireless communication systems when being executed by a processor.

It should be pointed out that according to the needs of implementation, each step/component described in this disclosure can be split into more steps/components, or two or more steps/components or partial operations of steps/components can be combined into new ones to achieve the purpose of the disclosure.

The above method according to the disclosure can be implemented in hardware, firmware, or implemented as software or computer code that can be stored in a recording medium (such as CD ROM, RAM, floppy disk, hard disk, or magneto-optical disk), or can be implemented as the computer code that is originally stored in a remote recording medium or a non-transitory machine-readable medium and will be stored in a local recording medium downloaded through the Internet. As such, the method described here can be stored in a general-purpose computer, a specific-purpose processor or a recording medium of programmable or dedicated hardware (such as ASIC or FPGA) for such software processing. It can be understood that a computer, a processor, a microprocessor controller or a programmable hardware includes a storage element (for example, RAM, ROM, flash memory, etc.) that can store or receive software or computer code. When the software or the computer code is accessed and executed by a computer, processor, or hardware, the processing method described here is implemented. In addition, when a general-purpose computer accesses the code for implementing the processing shown here, the execution of the code converts the general-purpose computer into a dedicated computer for executing the processing described here.

It should be understood that those of ordinary skill in the art can make improvements or modifications based on the above description, and all these improvements and modifications should fall within the protection scope of the appended claims of the present disclosure.

What is claimed is:

1. A channel prediction method for multiple-input and multiple-output (MIMO) wireless communication system, wherein the method comprises the following steps:
   obtaining frequency domain channel information of each of antenna pairs in the MIMO wireless communication system through channel estimation;
   processing the frequency domain channel information of each of the antenna pairs by inverse Fourier transform to obtain information of each of effective delay paths of the MIMO wireless communication system;
   utilizing a loss function of a width learning system and a coordinate descent method to solve an output weight of the width learning system to obtain the trained width learning system;

utilizing the trained width learning system to predict each of the effective delay paths of each of the antenna pairs, so as to obtain information of a next moment of each of the effective delay paths of each of the antenna pairs;

after summarizing the information of the next moment of each of the effective delay paths of each of the antenna pairs obtained through prediction, performing the Fourier transform to convert the above information into predicted frequency domain channel information.

2. The channel prediction method for MIMO wireless communication system according to claim 1, wherein the prediction process for predicting the effective delay path in the method is as follows:

$$\hat{h}_{m,n}^{pre}(i+\hbar,l)=F(\hat{h})$$

$$\hat{h}=[\hat{h}_{1,1}(i,l)^T,\hat{h}_{1,2}(i,l)^T,\ldots,\hat{h}_{1,N}(i,l)^T,$$

$$\hat{h}_{2,1}(i,l)^T,\hat{h}_{2,2}(i,l)^T,\ldots,\hat{h}_{2,N}(i,l)^T,$$

$$\vdots$$

$$\hat{h}_{M,1}(i,l)^T,\hat{h}_{M,2}(i,l)^T,\ldots,\hat{h}_{M,N}(i,l)^T]$$

$$\hat{h}_{m,n}(i,l)^T=[\hat{h}_{m,n}(i,l),\hat{h}_{m,n}(i-1,l),\ldots,\hat{h}_{m,n}(i-q+1,l)]^T$$

wherein, $\hat{h}_{m,n}^{pre}(i+\hbar,l)$ represents prediction information corresponding to $i+\hbar$ th sampling point of the l-th effective path of an antenna pair (m,n), and $\hat{h}_{m,n}(i,l)$ represents estimated channel information corresponding to the i-th sampling point of the l-th effective path of the antenna pair (m,n), wherein m=1, 2, 3, ..., M, n=1, 2, 3, ..., N and l=1, 2, 3, ..., L, wherein M and N respectively represent the number of transmitting antennas and the number of receiving antennas, $\hbar$ is a prediction time length, L is a total number of effective delay paths, q represents the number of historical sampling points used for each path, and F represents a channel predictor.

3. The channel prediction method for MIMO wireless communication system according to claim 1, wherein a training process of the width learning system in the method is as follows:

obtaining feature layer information of the width learning system, that is, $$X=[x_1,x_2,\ldots,x_\varphi]\in\mathbb{R}^{T_r\times\left(\sum_{p=1}^\varphi \mu_p\right)},$$

wherein, $x_p(t)=\tanh(\hat{h}(t)*W_{fp}+\beta_{fp})$, p=1, 2, 3, ..., φ, tan h(*) is a hyperbolic activation function, $\hat{h}(t)$ is the t-th data sample, N is data dimension of the sample, $T_r$ is a data length of the sample, $W_{fp}$ is an input weight matrix of the p-th unit of a feature layer, $\beta_{fp}$ is an input bias matrix of the p-th unit in the feature layer, $\mu_p$ is the number of neurons in the p-th unit in the feature layer, p=1, 2, 3, ..., φ, and φ is the number of units in the feature layer;

obtaining enhancement layer information of the width learning system, that is, $$Z=[z_1,z_2,\ldots,z_\delta]\in\mathbb{R}^{T_r\times\left(\sum_{j=1}^\delta v_j\right)},$$

wherein, $z_j=\tanh(\alpha(XW_{hj}+\beta_{hj}))$, j=1, 2, 3, ..., δ, $W_{hj}$ is an input weight matrix of the j-th unit of an enhancement layer, $\beta_{hj}$ is an input bias matrix of the j-th unit of the enhancement layer, α is a scaling factor, $v_j$ is the number of neurons in the j-th unit in the enhancement layer, j=1, 2, 3, ..., δ, and δ is the number of units in the enhancement layer;

under the circumstances, $Y=[\hat{h}|x_1, x_2, \ldots, x_\varphi|z_1, z_1, \ldots, z_\delta]W_\varphi^\delta=[\hat{h}|X|Z]W_\varphi^\delta$, $X_\varphi^\delta=[\hat{h}|X|Z]$ is defined, and the loss function is adopted to estimate an output weight $W_\varphi^\delta$ of an output layer.

4. The channel prediction method for MIMO wireless communication system according to claim 3, wherein the loss function of the width learning system in the method is as follows:

$$J=\min_{W_\varphi^\delta}\left(\sum_{t=1}^{T_r}(Y(t)-X_\varphi^\delta(t)W_\varphi^\delta)^2+\lambda_{1/2}\|W_\varphi^\delta\|_{\frac{1}{2}}^{\frac{1}{2}}\right)$$

wherein, $\lambda_{1/2}$ is a regularization coefficient of $l_{1/2}$ regularization.

5. The channel prediction method for MIMO wireless communication system according to claim 4, wherein a method for solving the output weight in the method is as follows:

utilizing a coordinate descent method to solve the output weight, wherein the specific method is as follows:

1) initializing a weight matrix $W_\varphi^\delta$ and a zero matrix $W_\varphi^{\delta int}$;
2) setting $W_\varphi^\delta=W_\varphi^{\delta int}$;
3) defining a label ρ=1;
4) setting $\beta^{int}=\beta$;
5) calculating $(W_\varphi^\delta)_\rho$ according to the loss function of the width learning system;
6) determining whether a formula $$\sum_{\rho=1}^{\left(N+\sum_{p=1}^\varphi \mu_p+\sum_{j=1}^\delta v_j\right)}|(W_\varphi^\delta)_\rho-(W_\varphi^{\delta int})_\rho|\le 10^{-8}$$

is satisfied, if the formula is satisfied, then ρ=ρ+1 and step 4) is performed, otherwise, step 5) is performed.

6. A channel prediction system suitable for MIMO wireless communication system, wherein the system comprises:

a frequency domain channel estimation module, configured to obtain frequency domain channel information of each of antenna pairs of the MIMO wireless communication system through channel estimation;

an effective delay path information acquisition module, configured to process the frequency domain channel information of each of the antenna pairs through inverse Fourier transform to obtain information of each of effective delay paths of the MIMO wireless communication system;

an initialization width learning system module, configured to train a width learning system;

a loss function calculation module, configured to calculate loss function;

an effective delay path information prediction module, configured to predict each of the effective delay paths of each of the antenna pairs according to the trained width learning system, and obtain information of a next moment of each of the effective delay paths of each of the antenna pairs;

a frequency domain channel information processing module, configured for summarizing the information of the next moment of each of the effective delay paths of each of the antenna pairs obtained through prediction, and then convert the information into the predicted frequency domain channel information by using the Fourier transform.

7. The channel prediction system suitable for MIMO wireless communication system according to claim 6, wherein an implementation method of the initialization width learning system module in the system is as follows:

obtaining feature layer information of the width learning system, that is, $$X = [x_1, x_2, \ldots, x_\varphi] \in \mathbb{R}^{T_r \times \left(\sum_{p=1}^{\varphi} \mu_p\right)},$$

wherein, $x_p(t) = \tan h(\hat{h}(t) * W_{fp} + \beta_{fp})$, $p=1, 2, 3, \ldots, \varphi$, $\tan h(*)$ is a hyperbolic activation function, $\hat{h}(t)$ is the t-th data sample, N is a data dimension of the sample, $T_r$ is a data length of the sample, $W_{fp}$ is an input weight matrix of the p-th unit of a feature layer, $\beta_{fp}$ is an input bias matrix of the p-th unit in the feature layer, $\mu_p$ is the number of neurons in the p-th unit in the feature layer, $p=1, 2, 3, \ldots, \varphi$, and $\varphi$ is the number of units in the feature layer;

obtaining enhancement layer information of the width learning system, that is, $$Z = [z_1, z_2, \ldots, z_\delta] \in \mathbb{R}^{T_r \times \left(\sum_{j=1}^{\delta} v_j\right)},$$

wherein, $z_j = \tan h(\alpha(XW_{hj} + \beta_{hj}))$, $j=1, 2, 3, \ldots, \delta$, $W_{hj}$ is an input weight matrix of the j-th unit of an enhancement layer, $\beta_{hj}$ is an input bias matrix of the j-th unit of the enhancement layer, $\alpha$ is a scaling factor, $v_j$ is the number of neurons in the j-th unit in the enhancement layer, $j=1, 2, 3, \ldots, \delta$, and $\delta$ is the number of units in the enhancement layer;

under the circumstances, $Y = [\hat{h}|x_1, x_2, \ldots, x_\varphi|z_1, z_1, \ldots, z_\delta] W_\varphi^\delta = [\hat{h}|X|Z] W_\varphi^\delta$, $X_\varphi^\delta = [\hat{h}|X|Z]$ is defined, and the loss function is adopted to estimate an output weight $W_\varphi^\delta$ of an output layer.

8. The channel prediction system suitable for MIMO wireless communication system according to claim 7, wherein an implementation method of the loss function calculation module in the system is as follows:

a loss function J is as follows:

$$J = \min_{W_\varphi^\delta} \left( \sum_{t=1}^{T_r} (Y(t) - X_\varphi^\delta(t) W_\varphi^\delta)^2 + \lambda_{1/2} \|W_\varphi^\delta\|_{\frac{1}{2}}^{\frac{1}{2}} \right)$$

wherein, $\lambda_{1/2}$ is a regularization coefficient of $l_{1/2}$ regularization.

9. The channel prediction system suitable for MIMO wireless communication system according to claim 8, wherein the coordinate descent method is adopted in the system to estimate the output weight of the width learning system.

* * * * *